April 8, 1958     HENRI-GEORGES DOLL     2,829,825
AUTOMATIC COMPUTING APPARATUS
Filed July 1, 1952
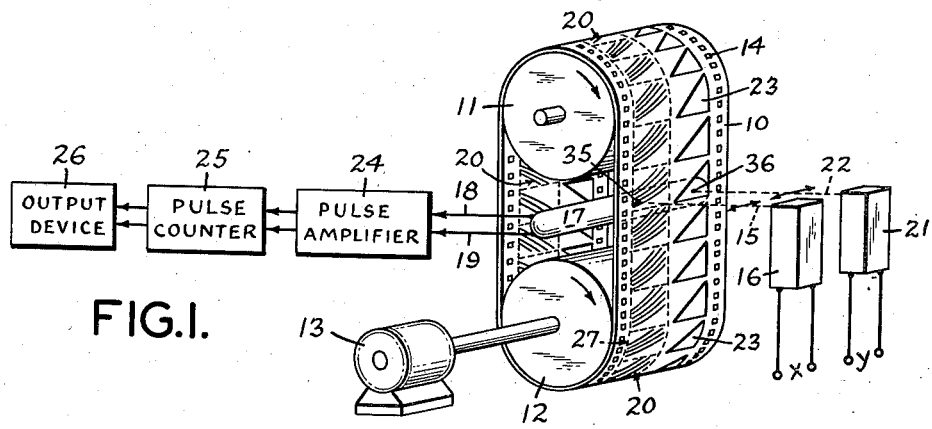
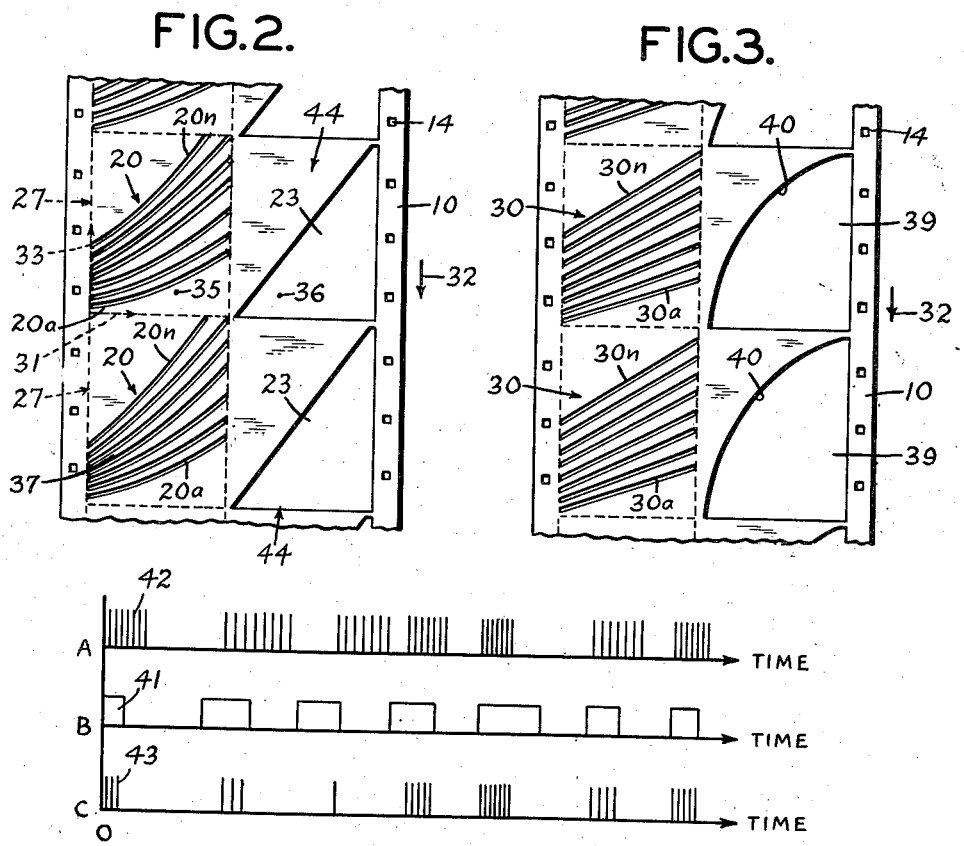
INVENTOR.
HENRI-GEORGES DOLL
BY
HIS ATTORNEYS.

United States Patent Office 2,829,825
Patented Apr. 8, 1958

2,829,825

AUTOMATIC COMPUTING APPARATUS

Henri-Georges Doll, Ridgefield, Conn., assignor, by mesne assignments, to Schlumberger Well Surveying Corporation, Houston, Tex., a corporation of Texas Application July 1, 1952, Serial No. 296,675

13 Claims. (Cl. 235—61)

The present invention relates to automatic computers and more particularly to new and improved computing apparatus which is adapted to provide a signal continuously representative of the value of a specified function of a plurality of independent variables as instantaneous values of the variables are supplied thereto.

The copending application Serial No. 296,649, filed July 1, 1952, for "Automatic Computer," by Nick A. Schuster discloses computing apparatus embodying an indicia bearing screen disposed in the path of a radiant energy beam. The indicia on the screen represent curves of a specified function of two independent variables for different values of the function and they are located with reference to coordinate axes intersecting in a common origin. The beam is moved in accordance with one independent variable along one coordinate axis while the screen is moved in the direction of the other coordinate axis which may have an expanded scale so as to accommodate a relatively large number of curve-representing indicia per unit length therealong, as required for good accuracy. As the curve-representing indicia on the screen sweep past the beam, it is modulated as a function of time and of said one independent variable. This produces a succession of light pulses which are directed to photoelectric means, thereby producing a corresponding succession of electric pulses. The value of the function for any given values of the independent variables is determined by counting the number of electric pulses occurring between time limits established by the other independent variable, electronic timing circuits operated in synchronism with the moving screen being utilized for this purpose.

The present application is addressed to an improvement upon the apparatus disclosed in the aforementioned copending application in which electromechanical means are employed in place of electronic timing circuits for establishing the timing interval during which the electric pulses corresponding to the curve-representing indicia are counted. More specifically, second screen means is provided which is movable in exact synchronism with the screen carrying the curve-representing indicia. The second screen means intercepts a second radiant energy beam and it carries indicia adapted to modulate the second beam of light to establish the aforementioned timing interval. The second beam is displaced relatively to the second screen means along a coordinate axis in accordance with values of one of the independent variables while the first beam is displaced relatively to the first screen means along a coordinate axis in accordance with values of another independent variable. Signals generated by indicia on the second screen means traversing the second beam establish the time interval during which curve-representing indicia on the first screen means are counted.

The invention will be more fully understood from the following detailed description taken with reference to the accompanying drawings, in which:

Fig. 1 is a schematic diagram of a typical embodiment of the invention;

Fig. 2 is a showing of a representative light modulating screen constructed in accordance with the invention;

Fig. 3 shows another typical screen constructed in accordance with the invention; and Fig. 4 is a graph illustrating the time sequence of several of the signals developed in the apparatus of Fig. 1.

In Fig. 1 a movable screen 10 may take the form of any of the screens disclosed in the aforementioned copending application. For example, the screen 10 may comprise a rotating belt having sprocket holes 14 so as to enable it to be moved by means of sprocket wheels 11 and 12 driven by a motor 13, preferably of constant speed.

As disclosed in the aforementioned application, a beam of light 15 is adapted to be moved perpendicularly to the direction of movement of the belt 10, as a function of the amplitude of one variable $x$ which may be represented by an electric signal applied to a mirror galvanometer 16. Behind the belt 10 is disposed an elongated photocell 17 suitably positioned to be able to receive light from the beam 15 regardless of the amplitude of the variable $x$, as permitted by the screen 10, and giving an electrical output between conductors 18 and 19 proportional to the intensity of the light impinging thereon.

Formed respectively on one or more frames 27 (Fig. 2) extending perpendicularly to the axis of rotation of the belt 10 in the path of the beam 15 are indicia representing one or more families of curves 20 of a specified function $u=f(x, y)$, the curves in each family corresponding to different values of the function. Preferably, the belt 10 is opaque and the curves $20_a \ldots 20_n$ of each family 20 comprise slots therein whereby a succession of light pulses is produced by the passing of the slots representing the curves $20_a \ldots 20_n$ between the photoelectric cell 17 and the beam 15. It will be readily understood that the belt 10 may be made transparent, in which event the indicia representing the family of curves 20 may be opaque. Also, the photocell 17 may be disposed on the same side of the belt 10 as the mirror galvanometer 16, and the light beam 15 modulated by the difference in the relative light characteristics of the belt 10 and the indicia representing the family of curves 20.

The light beam 15 is focused as an intense, small diameter spot on the belt 10 which is adapted to be moved from one side of each of the frames 27 to the other side thereof as a function of the variable $x$. The mirror galvanometer 16 is conventional but should be of the type that is substantially unaffected by vibrations and should have a time constant which is fast as compared to the expected rate of variation in the amplitude of the variable $x$.

As explained in the aforementioned application, movement of the belt 10 causes the beam of light 15 to be modulated by the family of curves corresponding to $u=f(x, y)$, as a function of time and of the variable quantity $x$. The light pulses thus produced may then be integrated between limits established by the variable $y$, whereby the instantaneous value of $u$ is continuously obtained. In accordance with the present invention, this integration is performed in a novel and highly effective manner.

An electric signal representing the variable quantity $y$ is applied to the mirror galvanometer 21 which deflects a second beam of light 22 transversely of a second series of frames 44 (Fig. 2) on the movable belt 10, perpendicularly to the direction of motion thereof, as a function of the instantaneous amplitude of the variable $y$. The galvanometer 21 is so positioned that the beam 22 impinges on the photocell 17 for all values of the variable $y$ unless interrupted by the screen 10.

Each frame 44 is in lateral registry with a corresponding frame 27 and it has formed therein a light transmitting window portion 23. The window portions 23 permit light pulses to pass through the belt 10, the time duration of which are a function of the instantaneous amplitude of the variable $y$ and of the speed of belt 10. The pulse generated by the interaction of the beam of light 22 and a particular window portion 23 may be employed to control the integration of the pulses generated by the interaction of the beam of light 15 and the corresponding family of curves 20 to produce the desired instantaneous value $u$ of the function, as described in greater detail below.

The output of the photocell 17 is connected through the conductors 18 and 19 to a pulse amplifier 24. The amplifier 24 is biased so as to pass electrical pulses generated by impingement of the beam 15 on the photocell 17 only when the beam 22 is also impinging on the photocell 17. These pulses may be counted by a conventional pulse counter 25 which gives an output 26 continuously proportional to the value $u$ of the function.

It will be understood that the areas occupied by the window portions 23 may, in fact, be opaque, the remaining portions of the frames being transparent. In such case, pulses would be counted only in the interval when the beam of light 15 is not impinging on the photocell 17. Of course, the window portions 23 may be transparent on an opaque background and the indicia corresponding to the family of curves 20 may be opaque on a transparent background.

The operation of this system may be more fully understood with reference to Fig. 4, in which there are shown typical graphs illustrating the time sequence of certain of the electric signals developed in the apparatus. In Fig. 2 only one frame 27 and the corresponding frame 44 will be considered, it being understood that the sequence of operations will be the same for the remaining frames. The curves comprising the family 20 on the frame 27 on which the beam of light impinges may be any well known function of $x$ and $y$ or may be determined experimentally, as, for example, in electrical well logging of earth formations traversed by a bore hole. The coordinate axis 31 perpendicular to the direction of motion 32 of the belt 10 may correspond to $y=0$ and the coordinate axis 33 may correspond to $x=0$. In accordance with the principles set forth in the aforementioned application, the scale for the coordinate axis 33 may be expanded by any desired amount whereby the longitudinal spacing between the individual curves $20_a \ldots 20_n$ may be increased for greater accuracy.

Assuming that the beam 15 impinges upon the screen 10 at the point 35 corresponding to the instantaneous amplitude of the variable $x$, it can be seen that as the indicia representing the family of curves 20 in the frame 27 are swept past the beam 15 a plurality of light pulses represented by the lines 42 in Fig. 4 will be generated, the separation time between adjacent pulses being determined by the instantaneous amplitude of the independent variable $x$ and the speed of rotation of the belt 10.

At the same instant of time, the beam 22 will impinge upon the belt 10 at the point 36 as determined by the instantaneous amplitude of the independent variable $y$. As the window portion 23 is swept past the beam 22, a light pulse of wave form 41 (Fig. 4) will be generated, the duration of which is thus determined by the variable $y$ and the speed of rotation of the belt 10. If the speed of the belt 10 is constant and if the window portions 23 are triangular in shape as shown in Fig. 2, the duration of the pulse 41 may be proportional to the instantaneous amplitude of variable $y$. As stated, the amplifier 24 is biased so that it passes the pulses produced by the beam 15 only for the duration of the control pulse produced by the beam 22. Thus, in Fig. 4, although seven pulses 42 were produced by the beam 15, only three pulses 43 are passed by the amplifier 24, being the number occurring during the life of the control pulse 41.

The pulses 43 (Fig. 4) are then counted by the counter 25 as an indication of the instantaneous amplitude $u$ of the function.

In Fig. 4 are shown typical pulse diagrams obtainable, for example, with the screens shown in Fig. 2. Thus, the light pulses generated by the interaction of the indicia representing the family of curves 20 and light beam 15 are plotted as a function of time in graph A. For the type of indicia shown in the frames 27 of Fig. 2 the same number of pulses will be generated for each instantaneous value of the variable $x$ but their occurrence time and separation will be both a function of the amplitude of the variable $x$ and a function of the speed of the belt 10. In graph B of Fig. 4 the relatively broad integrating pulses 41 generated by the interaction of the window portions 23 and the light beam 22 have a time duration which is a function of the variable $y$ and of the speed of the belt 10. The graph C in Fig. 4 is a representation of the pulses 43 constituting the output of the amplifier 24. The number of pulses 43 represents the instantaneous value of the function $u=f(x, y)$ for the instantaneous values of the variables $x$ and $y$ obtaining at the time the pulses 42 and 41, respectively, are produced.

If it is desired to separate the curves $20_a \ldots 20_n$ further, particularly in the congested region 37 of the frame 27 near the origin (Fig. 2), the scale for the coordinate axis 33 may be made nonlinear as shown in Fig. 3, for example. If the curves depicting the function $u=f(x, y)$ are nonlinear when plotted in linear rectangular coordinates, as in Fig. 2, they may take the linear form of the curves $30_a \ldots 30_n$ in Fig. 3 when a nonlinear scale is provided for the coordinate axis 33. The window portion 39 in Fig. 3 which produces the control pulse must then have a correspondingly nonlinear curvature 40 in order to compensate for the nonlinearity of the time coordinate of the curves $30_a \ldots 30_n$.

The invention thus provides novel and highly effective computer apparatus which is simple and accurate in operation yet rugged in construction. Since the time intervals during which the pulses 42 of graph A in Fig. 4 are counted are determined by scanning indicia on a member which moves in exact synchronism with the member carrying the curve-representing indicia, small variations in the speed of movement of the latter member will not affect the accuracy of the computation provided that counter 25 is adapted to give an output proportional to the number of pulses counted per frame. If said velocity is maintained constant, counter 25 may give an output proportional to the number of pulses counted per unit time.

It will be understood that the above-described embodiment is illustrative only and subject to many modifications within the scope of the appended claims. For example, other forms of coincidence circuits may be employed for defining the time limits of the interval during which the light pulses are to be counted. Thus, separate photocells may be employed for the two beams of light, suitable means being provided for supplying their combined outputs to any conventional coincidence circuit. The invention, therefore, is not to be limited to the embodiments disclosed but is to have the breadth of scope defined by the following claims.

I claim:

1. In computer apparatus, the combination of a member carrying a plurality of first and second indicia, means forming a first radiant energy beam adapted to impinge upon said member and said first indicia, means for moving said member in one direction to modulate said beam as a function of said first indicia, and means including a second radiant energy beam adapted to impinge upon said member and said second indicia responsive to the velocity of said member for establishing a time interval for utilization of said modulated beam.

2. In computer apparatus, the combination of a member carrying a plurality of first and second indicia, means forming a first radiant energy beam adapted to impinge upon said member and said first indicia, means for moving said member in one direction to modulate said beam as a function of time and of said first indicia, means for utilizing said modulated beam during a selected time interval, and means including a second radiant energy beam adapted to impinge upon said member and said second indicia responsive to the velocity of said member for controlling said utilizing means to establish said time interval.

3. In computer apparatus, the combination of a member carrying a plurality of first and second indicia, means forming a radiant energy beam adapted to impinge upon said member and said first indicia, means for deflecting said beam in one direction as a function of instantaneous values of a variable, means for moving said member in another direction to modulate said beam as a function of said first indicia, of said variable, and of time, means for utilizing said beam during a selected time interval, and means including an electromechanical device cooperating with said second indicia, said last-mentioned means being jointly responsive to the velocity of said member and to the instantaneous value of another variable for controlling said utilizing means to establish said time interval.

4. In computer apparatus for determining the value of a function of two independent variables, the combination of a screen member having indicia thereon representing curves of said function for different values thereof, said indicia being positioned with reference to angularly disposed coordinate axes, a first radiant energy beam disposed to impinge upon said screen and said indicia and to be deflected relatively thereto in the direction of one of said coordinate axes as a function of one of said variables, means for moving said screen relatively to said beam in the direction of the other of said coordinate axes to modulate said beam as a function of said indicia, means responsive to said modulated beam, control indicia on the screen member, and means including a second radiant energy beam disposed to impinge upon said screen and said control indicia jointly responsive to the velocity of said member and to the instantaneous value of the other of said independent variables for controlling said last-named means.

5. In computer apparatus for determining the value of a function of two independent variables, the combination of a screen member having first indicia thereon representing curves of said function for different values thereof, said first indicia being positioned with reference to angularly disposed coordinate axes, means carrying second indicia movable in exact synchronism with said screen, said second indicia having a predetermined relationship to said first indicia, a radiant energy beam disposed to impinge upon said screen and said indicia and to be deflected relatively thereto in the direction of one of said coordinate axes as a function of one of said variables, means for moving said screen relatively to said beam in the direction of the other of said coordinate axes to modulate said beam as a function of said first indicia, means for converting said modulated beam to an electric signal, and means including an electromechanical device cooperating with said second indicia, said last-mentioned means being and said control indicia jointly responsive to the velocity of said member and to the instantaneous value of the other of said independent variables for establishing the duration of said electric signal.

6. In computer apparatus for determining the value of a function of two independent variables, the combination of a screen member having indicia thereon representing curves of said function for different values thereof, said indicia being positioned with reference to angularly disposed coordinate axes, a first radiant energy beam disposed to impinge upon said screen and said indicia and to be deflected relatively thereto in the direction of one of said coordinate axes as a function of one of said variables, means for moving said screen relatively to said beam in the direction of the other of said coordinate axes to modulate said beam as a function of said indicia, photoelectric means disposed to receive said modulated beam, electrical amplifier means connected to receive signals from said photoelectric means and normally in one condition of operation, control indicia on the screen member, and means including a second radiant energy beam disposed to impinge upon said screen jointly responsive to the velocity of said member and to the instantaneous value of the other of said independent variables for changing the operating condition of said amplifier means.

7. In computer apparatus, the combination of belt means carrying first and second indicia movable in exact synchronism and with said first indicia in predetermined relation to said second indicia, said first indicia representing curves of a function for various values thereof and positioned with reference to angularly disposed coordinate axes, one of said axes being in the direction of said belt means and the other of said axes running transversely to said belt means, means forming a first radiant energy beam impinging upon said belt means and said first indicia, means forming a second radiant energy beam impinging upon said belt means and said second indicia, means for moving said belt means to modulate said first and second beams as functions, respectively, of said first and second indicia, means for utilizing said modulated first beam during a selected time interval, and means responsive to said second modulated beam for controlling said utilizing means to establish said time interval.

8. In computer apparatus, the combination of first indicia carrying means, second indicia carrying means movable in exact synchronism with said first indicia carrying means and with the second indicia thereon in predetermined relation to the first indicia on the first indicia means, means forming a first radiant energy beam impinging upon said first indicia carrying means and said first indicia, means for deflecting said first beam in one direction as a function of the instantaneous value of a first variable, means forming a second radiant energy beam impinging upon said second indicia carrying means and said second indicia, means for deflecting said second beam in said one direction as a function of the instantaneous value of a second variable, means for moving said first and second indicia carrying means as a unit in another direction, thereby modulating said first beam as a function of time, of said first variable and of the first indicia on said first indicia carrying means, and modulating said second beam as a function of time, of said second variable, and of the second indicia on said second indicia carrying means, means for utilizing said first modulated beam during a selected time interval, and means responsive to said second modulated beam for controlling said utilizing means to establish said time interval.

9. In computer apparatus, the combination of a first indicia carrying means, second indicia carrying means movable in exact synchronism with said first indicia carrying means and with the second indicia thereon in predetermined relation to the first indicia on the first indicia carrying means, means forming a first radiant energy beam impinging upon said first indicia carrying means, and said first indicia, means for deflecting said first beam in one direction as a function of the instantaneous value of a first variable, means forming a second radiant energy beam impinging upon said second indicia carrying means and said second indicia, means for deflecting said second beam in said one direction as a function of the instantaneous value of a second variable, means for moving said first and second indicia carrying means as a unit in another direction, thereby modulating said first beam as a function of time, of said first variable and of the first indicia on said first indicia carrying means, and modulating said second beam as a function of time, of said second variable, and of the second indicia on said second indicia carrying means, photoelectric cell means disposed to receive said modulated first and second beams, amplifier means responsive only to signals produced by said photoelectric means when both of said first and second modulated beams impinge thereupon, and output device means connected to receive the output of said amplifier means.

10. In computer apparatus, a member adapted to be moved at a desired speed, said member having first indicia thereon representing curves of a function for various values thereof and positioned with reference to angularly disposed coordinate axes, one of said axes being in the direction of movement of said member and the other of said axes running transversely to the direction of movement of said member, and second indicia carried by said member positioned transversely, with respect to the direction of movement of said member, from said first indicia.

11. In computer apparatus, belt means adapted to be moved at a desired speed, said belt means carrying first curve-representing indicia and second indicia, said first indicia formed from curves of a function for various values thereof and positioned with reference to angularly disposed coordinate axes, one of said axes being in the direction of the belt means and the other of said axes running transversely to the belt means, said second indicia carried by said belt means in exact synchronism and in predetermined relation to said first indicia and displaced from said first indicia in said transverse direction.

12. In computer apparatus, belt means adapted to be moved at a desired speed, said belt means having a plurality of like frames thereon, means forming first indicia on each of said frames representing curves of a function for various values thereof and positioned with reference to angularly disposed coordinate axes, one of said axes being in the direction of the belt means and the other of said axes running transversely to the belt means, and second indicia carried by said belt means in exact synchronism and in predetermined relation to said first indicia and displaced from said first indicia in said transverse direction.

13. In computer apparatus, an endless belt adapted to be moved at a desired speed, said belt divided into a plurality of like frames, means forming like indicia on said frames representing curves of a function for various values thereof and positioned with reference to angularly disposed coordinate axes, one of said axes being in the direction of the belt and the other of said axes running transversely to the belt, and further indicia carried by said belt in exact synchronism and in predetermined relation to said curve-representing indicia and displaced from said curve-representing indicia in said transverse direction.

References Cited in the file of this patent

UNITED STATES PATENTS

| | | |
|---|---|---|
| 2,088,297 | Koenig | July 27, 1937 |
| 2,097,392 | Finch | Oct. 26, 1937 |
| 2,131,911 | Ayres | Oct. 4, 1938 |
| 2,398,238 | McNatt | Apr. 9, 1946 |

U. S. DEPARTMENT OF COMMERCE
PATENT OFFICE
CERTIFICATE OF CORRECTION

Patent No. 2,829,825

April 8, 1958

Henri-Georges Doll

It is hereby certified that error appears in the printed specification of the above numbered patent requiring correction and that the said Letters Patent should read as corrected below.

Column 5, line 52, for "said indicia" read -- said first indicia --; line 61, strike out "and said control indicia"; column 6, line 7, before "jointly" insert -- and said control indicia --.

Signed and sealed this 20th day of May 1958.

(SEAL)
Attest:
KARL H. AXLINE
Attesting Officer

ROBERT C. WATSON
Commissioner of Patents